US009333964B2

(12) United States Patent  
Tamai et al.

(10) Patent No.: US 9,333,964 B2  
(45) Date of Patent: May 10, 2016

(54) HYBRID POWERTRAIN AND METHOD FOR CONTROLLING THE SAME

(71) Applicant: GM GLOBAL TECHNOLOGY OPERATIONS LLC, Detroit, MI (US)

(72) Inventors: Goro Tamai, West Bloomfield, MI (US); Lan Wang, Troy, MI (US); Norman K. Bucknor, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/329,002

(22) Filed: Jul. 11, 2014

(65) Prior Publication Data

US 2016/0009268 A1 Jan. 14, 2016

(51) Int. Cl.
| | |
|---|---|
| *B60L 11/00* | (2006.01) |
| *B60K 6/20* | (2007.10) |
| *B60W 10/08* | (2006.01) |
| *B60W 10/06* | (2006.01) |
| *B60W 20/00* | (2016.01) |

(52) U.S. Cl.  
CPC ............... *B60W 10/08* (2013.01); *B60W 10/06* (2013.01); *B60W 20/10* (2013.01); *B60W 2510/0657* (2013.01); *B60W 2510/083* (2013.01); *B60W 2710/083* (2013.01)

(58) Field of Classification Search  
CPC ..... B60W 10/06; B60W 10/11; B60W 30/18; B60W 2540/10; B60W 2540/12; B60W 2710/0644; B60W 2720/106; B60W 10/115; B60W 2520/105; B60W 2710/0677; B60W 30/19; B60W 2710/105; B60W 10/08; B60W 20/10

USPC ................... 701/22, 54; 180/65.21  
See application file for complete search history.

(56) References Cited

U.S. PATENT DOCUMENTS

| | | | | |
|---|---|---|---|---|
| 2002/0129788 | A1* | 9/2002 | O'Neil .................. | B60W 10/06 123/350 |
| 2004/0162182 | A1* | 8/2004 | Joe ......................... | B60L 15/20 477/2 |
| 2009/0118943 | A1* | 5/2009 | Heap ...................... | B60K 6/445 701/54 |
| 2009/0118944 | A1* | 5/2009 | Heap ...................... | B60K 6/365 701/54 |
| 2011/0241580 | A1* | 10/2011 | Winterhalter ........... | H02P 27/06 318/400.3 |

* cited by examiner

*Primary Examiner* — Muhammad Shafi  
(74) *Attorney, Agent, or Firm* — Quinn Law Group, PLLC

(57) ABSTRACT

A method for controlling a hybrid powertrain includes the following steps: receiving a torque request; determining a plurality of possible motor torques for the first and second electric machines capable of achieving the torque requested; determining system power losses of the powertrain for all the possible motor torques for the first and second electric machines capable of achieving the torque requested; determining a lowest power loss of the system power losses determined for the plurality of possible motor torques for the first and second electric machines; determining a first operating torque for the first electric machine and a second operating torque for the second electric machine that correspond with the lowest power loss; and commanding the first electric machine to generate the first operating torque and the second electric machine to generate the second operating torque in order to achieve the torque requested while minimizing the system power losses.

20 Claims, 2 Drawing Sheets

HYBRID POWERTRAIN AND METHOD FOR CONTROLLING THE SAME

TECHNICAL FIELD

The present disclosure relates to a hybrid powertrain and a method for controlling the same.

BACKGROUND

Many hybrid vehicles utilize hybrid powertrains that have more than one power source for propulsion. For example, a hybrid electric vehicle includes an engine and at least one electric machine. The engine may be an internal combustion engine, and the electric machine may be an electric motor-generator.

SUMMARY

It is useful to minimize power losses in a hybrid powertrain when the electric machines are driving the vehicle in order to maximize the powertrain efficiency. To this end, the present disclosure describes a method for controlling a hybrid powertrain. In an embodiment, the method includes the following steps: (a) receiving, via a controller, a torque request; (b) determining, via the controller, a plurality of possible motor torques of the first and second electric machines capable of achieving the torque requested; (c) determining the system power losses of the powertrain for all the possible motor torques for the first and second electric machines capable of achieving the torque requested; (d) determining a lowest power loss of the system power losses determined for the plurality of possible motor torques of the first and second electric machines; (e) determining a first operating torque for the first electric machine and a second operating torque for the second electric machine that correspond with the lowest power loss; and (f) commanding, via the controller, the first electric machine to generate the first operating torque and the second electric machine to generate the second operating torque in order to achieve the torque requested while minimizing the system power losses.

The present disclosure also relates to a hybrid powertrain. In an embodiment, the hybrid powertrain includes a drive axle, an engine operatively coupled to the drive axle, a first electric machine operatively coupled to the drive axle, a second electric machine operatively coupled to the drive axle, and a controller in communication with the engine, the first electric machine, and the second electric machine. The controller is programmed to execute the steps of the method described above.

The above features and advantages and other features and advantages of the present teachings are readily apparent from the following detailed description of the best modes for carrying out the teachings when taken in connection with the accompanying drawings.

DETAILED DESCRIPTION

Figure 1:
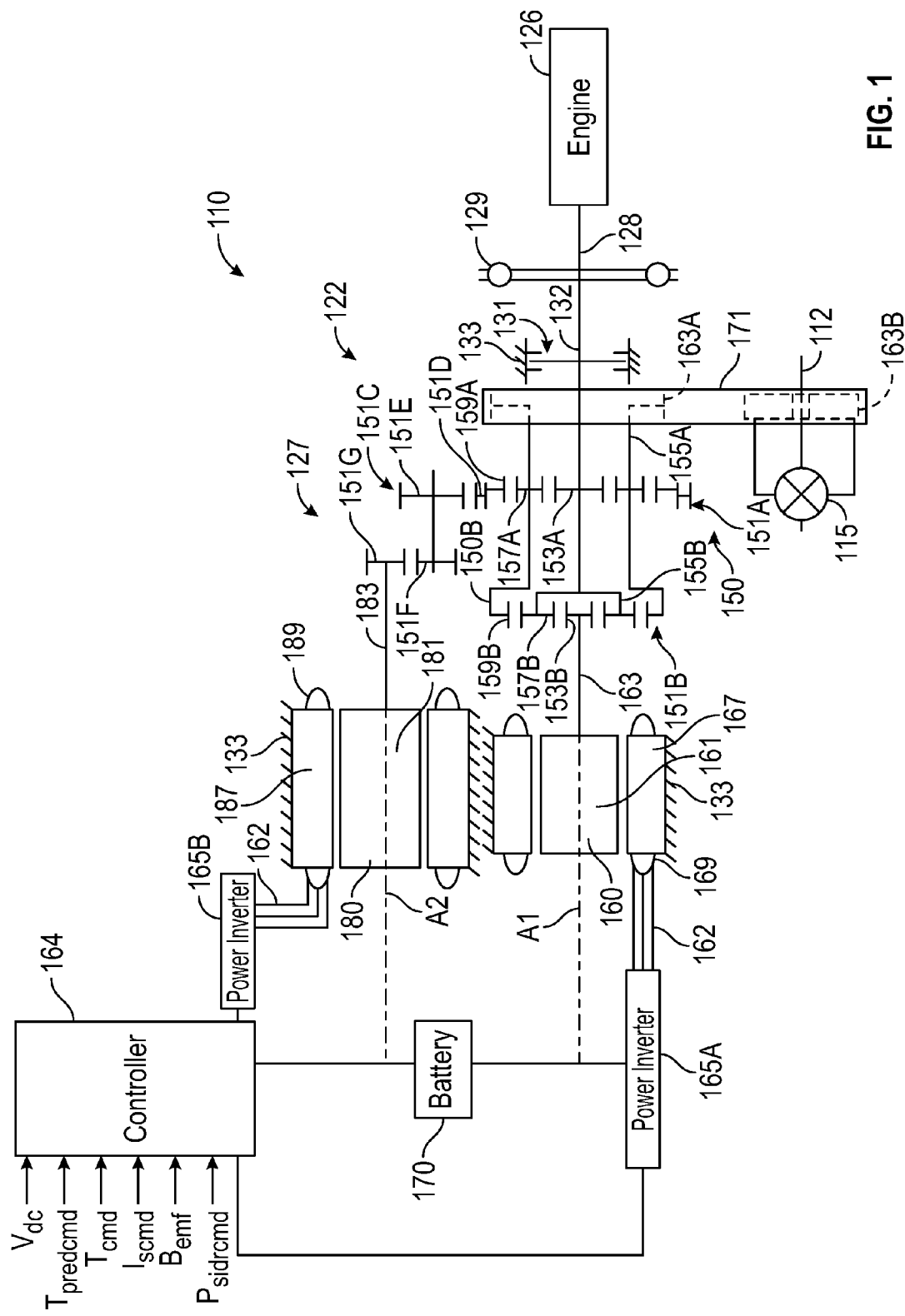
FIG. 1 is a schematic illustration of a vehicle with a hybrid powertrain.

Referring to the drawings, wherein like reference numbers refer to like components throughout the several views, FIG. 1 schematically illustrates a vehicle 110 including a hybrid powertrain 127. The hybrid powertrain 127 can generate torque in order to propel the vehicle 110. The hybrid powertrain 127 or any other suitable hybrid powertrain can be controlled according to the method 200 described below in order to minimize power losses. In the depicted embodiment, the hybrid powertrain 127 includes a first electric machine 160, a second electric machine 180, and an engine 126. As used herein, an "engine" can be an internal combustion engine, or any other prime mover. An "electric machine" can be any electric motor that uses three-phase alternating current. An electric machine can be configured to be used as only a motor, as only a generator, or as both a motor and a generator in various embodiments within the scope of the present disclosure.

The first and second electric machines 160, 180 are interconnected through a gearing arrangement 150 as a hybrid electrically-variable transmission 122. An "electrically variable transmission" can be a transmission with a planetary gear set having one member operatively connected to an electric machine and another member operatively connected to an engine. The speed of the electric machine can be controlled to vary the speed of a third member of the planetary gear set to meet commanded torque requirements, allowing the engine 126 to be operated at selected efficient parameters.

The first and second electric machines 160, 180 can be controlled to function as motors or as generators and, with the engine 126, provide a variety of different operating modes under various operating conditions. The first electric machine 160 has a rotor 161 with a rotor shaft 163 rotatable about an axis A1, and a stator 167 with stator windings 169. The stator 167 is grounded to a stationary member 133, which can be the same stationary member to which an input brake 131 is grounded, or a different stationary member, such as a motor housing. Cables 162 connect a power inverter 165A to the stator windings 169.

The second electric machine 180 has a rotor 181 with a rotor shaft 183 rotatable about an axis A2, and a stator 187 with stator windings 189. The stator 187 is grounded to a stationary member 133, which can be the same stationary member to which the input brake 131 and the stator 187 are grounded, or a different stationary member, such as a motor housing. Cables 162 connect a power inverter 165B to the stator windings 189. The power inverters 165A, 165B may be three-phase voltage source inverter modules.

A controller 164 is operatively connected to both power inverters 165A and 165B and to an energy storage device such as a battery 170 or battery module. The controller 164 is in communication with the engine 126, the first electric machine 160, and the second electric machine 180. The controller 164 controls the operation of the first and second electric machines 160 and 180 as motors or as generators, and has a processor configured with an algorithm that carries out the method 200 for minimizing system power loss described with respect to FIG. 2. The controller 164 can generate disable or enable signals to disable or enable switching within the power inverters 165A and 165B. For example, controller 164 can receive signals including a measured DC link or input voltage ($V_{dc}$), torque command (Tcmd) signals from a vehicle operator or a vehicle control system (e.g., cruise control system), stator current command ($I_{scmnd}$) signals or alternatively stator current command signals from a current mapping module, which are used to compute $I_{scmd}$, back EMF (Bemf) signals which may be computed from the stator current command signals, minimum flux preparation command ($P_{sidrcmd}$) signals, predicted torque command ($T_{Predcmd}$) signals and other operating signals. Based on the signals described above, the controller 164 can calculate electrical power loss values of operating the first and second electric machines 160, 180 and power inverters 165A and 165B of the hybrid powertrain 127 and generate control signals to effectively enable or disable the power inverters 165A and 165B of the hybrid powertrain 127.

The engine 126 has an engine crankshaft 128 connected through a damping mechanism 129 to an input member 132 of the transmission 122. A separate controller may be in communication with the controller 164 and control operation of the engine 126. An input brake 131 can be engaged to connect the input member 132 to a stationary member 133. In the depicted embodiment, the input brake 131 can move between a disengaged position and an engaged position. In the engaged position, the input brake 131 interconnects the engine crankshaft 128 to the stationary member 133. As a result, the engine crankshaft 128 cannot rotate and the engine 126 cannot run. In other words, the input brake 131 can stop (or brake) the engine 126 when it is in the engaged position. Conversely, when the input brake 131 is in the disengaged position, the engine crankshaft 128 is not coupled to the stationary member 133. Consequently, the engine crankshaft 128 is free to rotate, and the engine 126 is free to run.

The gearing arrangement 150 includes two interconnected planetary gear sets 151A and 151B. The first planetary gear set 151A has a sun gear member 153A connected to rotate with the input member 132, a carrier member 155A supporting pinion gears 157A, and a ring gear member 159A. The pinion gears 157A mesh with the sun gear member 153A and the ring gear member 159A. The second planetary gear set 151B has a sun gear member 153B connected to rotate with the rotor shaft 163 and meshing with pinion gears 157B supported on a carrier member 155B. The pinion gears 157B also mesh with a ring gear member 159B. The gearing arrangement 150 includes a transfer gear set 151C with transfer gears 151D, 151E, 151F and 151G that transfer torque between the rotor shaft 183 and the ring gear member 159A. The ring gear member 159B is continuously connected with the carrier member 155A and a pulley 163A by a connecting member 150B to rotate at the same speed. The carrier member 155B is continuously connected with the sun gear member 153A and the input member 132 to rotate at the same speed, or to be held stationary when the input brake 131 is engaged. The pulley 163A rotates with the carrier member 155A and serves as an output member of the transmission 122, transferring torque through a belt 171 or chain to another pulley 163B which transfers torque to a drive axle 112 through a differential 115.

The hybrid powertrain 127 is controllable to operate in a variety of different operating modes selected by the controller 164 based on vehicle operating conditions. One such operating mode is an electrically-variable operating mode in which the engine 126 is on, and the first and second electric machines 160, 180 are controlled to operate as motors or as generators as required in order to vary the speed of the output member (pulley 163A) to meet operator requested torque at the drive axle 112.

The hybrid powertrain 127 is also operable in an electric-only operating mode with the engine 126 off and the input brake 131 engaged. Both electric machines 160 and 180 are controlled to operate as motors or as generators as needed to meet operator torque demand as long as the state-of-charge of the battery 170 remains above a predetermined minimum state of charge. The hybrid powertrain 127 is also operable in an engine-off, regenerative mode, in which the engine 126 is off, and both electric machines 160 and 180 are controlled to operate as generators to slow the output member, pulley 163A, and thereby the drive axle 112. The first and second electric machines 160, 180 are therefore operatively coupled to the drive axle 112. The engine 126 is also operatively coupled to the drive axle 112.

Figure 2:
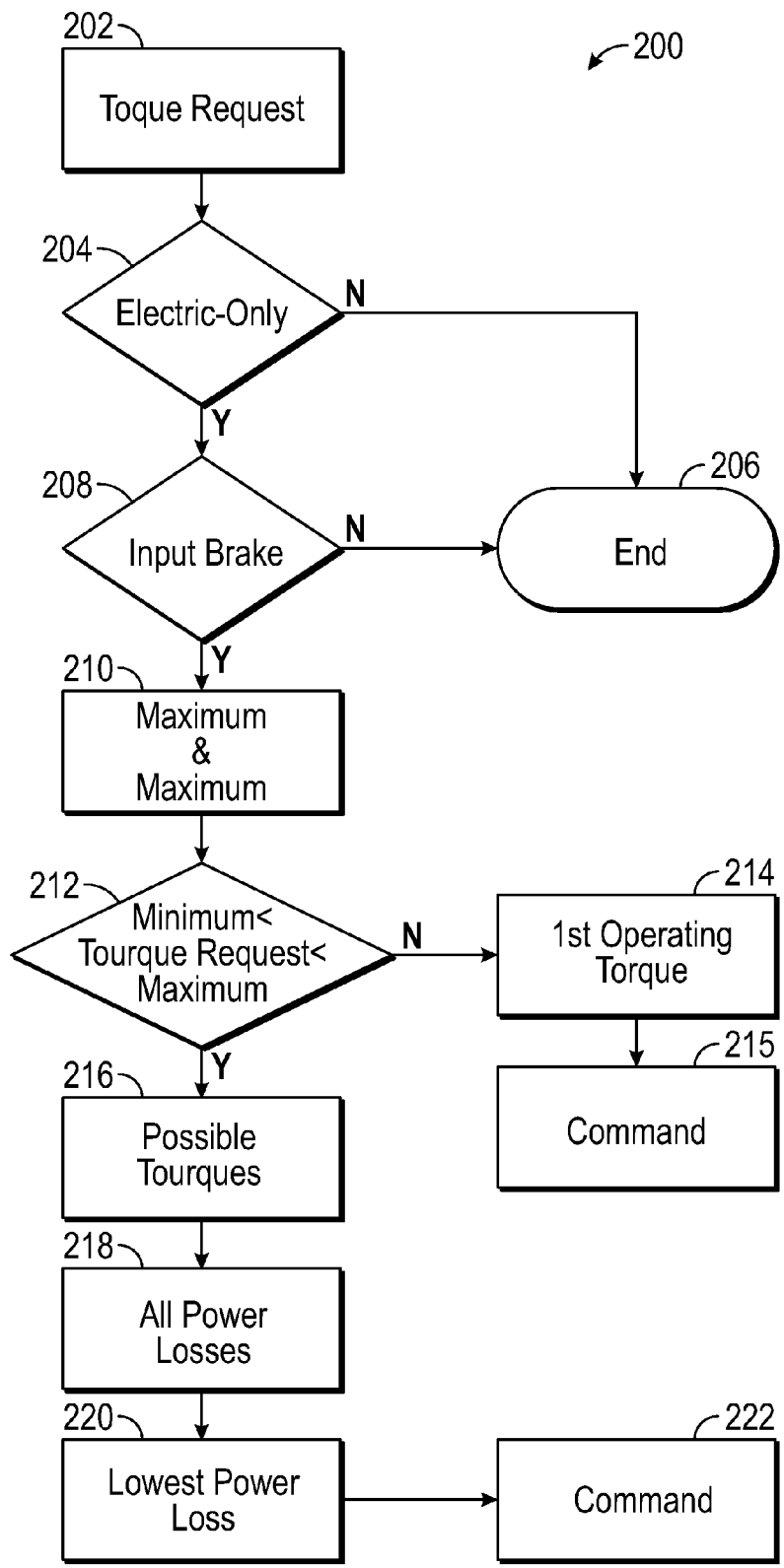
FIG. 2 is a flowchart of a method for controlling the hybrid powertrain of FIG. 1.

FIG. 2 is a flowchart of a method 200 for controlling the hybrid powertrain 127 in order to minimize system power losses. The method 200 begins with step 202. Step 202 entails receiving a torque request. As discussed above, the controller 164 can receive the torque request. In doing so, the controller 164 can receive, for example, the torque command signal Tcmd from the vehicle operator or a vehicle control system, such as a cruise control system. In the present disclosure, the term "torque request" refers to an amount of the torque requested at the drive axle 112. Then, the method 200 continues to step 204.

Step 204 entails determining, via the controller 164, whether the hybrid powertrain 127 is in the electric-only operating mode or the engine-off, regenerative mode. If the hybrid powertrain 127 is neither in the electric-only operating mode nor the engine-off, regenerative mode, then the method 200 proceeds to step 206, in which the method 200 ends. Conversely, if the controller 164 determines that the hybrid powertrain 127 is operating either in the electric-only operating mode or the engine-off, regenerative mode, then the method 200 continues to step 208.

Step 208 is optional and entails determining, via the controller 164, whether the input brake 131 is in the engaged position and is therefore interconnecting the engine crankshaft 128 and the stationary member 133. If the input brake 131 is in the disengaged position and the engine 126 is therefore free to run, then the method 200 proceeds to step 206. As discussed above, in step 206, the method 200 ends. On the other hand, if the input brake 131 is in the engaged position and is therefore interconnecting the engine crankshaft 128 and the stationary member 133, then the method 200 continues to step 210.

Step 210 entails determining, via the controller 164, a maximum output torque and a minimum output torque capable of being jointly generated by the first electric machine 160 and the second electric machine 180 based, at least in part, on a maximum battery power, a minimum battery power, a maximum motor torque of the first electric machine 160, a maximum motor torque of the second electric machine 180, and a minimum motor torque of the first electric machine 160, a minimum motor torque of the second electric machine 180, and the input brake torque capacity. In the present disclosure, the "maximum output torque" refers to the maximum torque that can be applied to the drive axle 112 by the first and second electric machines 160, 180. The "minimum output torque" refers to the minimum torque that can be applied to the drive axle 112 by the first and second electric machines 160, 180. As used herein, the "maximum motor torque" refers to the maximum torque capable of being generated by the first electric machine 160 and/or the second electric machine 180. The "minimum motor torque" refers to the minimum torque capable of being generated by the first electric machine 160 and/or the second electric machine 180. The "minimum battery power" refers to the minimum electrical power that can be supplied by the battery 170 (or battery pack) to the first electric machine 160 and the second electric machine 180. The "maximum battery power" refers to the maximum electrical power that can be supplied by the battery 170 (or battery pack) to the first electric machine 160 and the second electric machine 180. The "input brake torque capacity" refers to the maximum torque that the input brake 131 can withstand without causing movement of the engine crankshaft 128. Data containing the maximum battery power, the minimum battery power, the maximum motor torque of the first electric machine 160, the maximum motor torque of the second electric machine 180, the minimum motor torque of the first electric machine 160, the minimum motor torque of the second electric machine 180, and the input brake torque capacity can be stored in the controller 164 or on an external memory. The maximum output torque and the minimum output torque delimit an output torque range for the first electric machine 160 and the second electric machine 180. After determining the maximum output torque and the minimum output torque, the method 200 proceeds to step 212.

Step 212 entails determining, via the controller 164, whether the torque requested in step 202 falls within the output torque range defined by the maximum output torque and the minimum output motor torque capable of being jointly generated by the first electric machine 160 and the second electric machine 180. In other words, the controller 164 compares the torque requested in step 202 with the maximum output torque and the minimum output motor torque capable of being jointly generated by the first electric machine 160 and the second electric machine 180. In doing so, the controller 164 can determine whether the torque requested in step 202 is less than or equal to the maximum output motor torque determined in step 210 or greater than or equal to the minimum output motor torque determined in step 210. If the torque requested in step 202 falls outside the output torque range defined by the maximum output torque and the minimum output motor torque determined in step 210, then the method proceeds to step 214. In other words, if the controller 164 determines that the torque requested in step 202 is greater than or equal to the maximum output torque determined in step 210 or less than or equal to the minimum output torque determined in step 210, then the method 200 proceeds to step 214. However, if the torque requested in step 202 falls within the output torque range defined by the maximum output torque and the minimum output motor torque determined in step 210, then the method 200 continues to step 216. Stated differently, if the controller 164 determines that the torque requested in step 202 is less than or equal to the maximum output torque determined in step 210 and greater than or equal to the minimum output torque determined in step 210, then the method 200 continues to step 216.

Step 214 entails determining, via the controller 164, the first operating output torque for the first electric machine 160 and the second operating torque for the second electric machine 180 based, at least in part, on the maximum output torque and the minimum output torque determined in step 210 in order to satisfy the constraints of the hybrid powertrain 127 (i.e., the system constraints). In the present disclosure, the term "first operating torque" refers to the torque produced by the first electric machine 160, and the "second operating torque" refers to the torque produced by the second electric machine 180. In step 214, the controller 164 determines and selects the first and second operating torques for the first and second electric machines 160, 180 based, at least in part, on the maximum output torque and minimum output motor torque determined in step 210. Next, the method 200 proceeds to step 215.

Step 215 entails commanding, via the controller 164, the first electric machine 160 to generate the first operating torque determined in step 214 and the second electric machine 180 to generate the second operating torque determined in step 214. Further, step 215 further includes generating the first and second operating torques determined in step 214 using the first and second electric machines 160, 180, respectively.

As discussed above, if the torque requested in step 202 falls within the output torque range defined by the maximum output torque and the minimum output torque determined in step 210, then the method 200 continues to step 216. Step 216 entails determining, via the controller 164, a plurality of possible motor torques for the first and second electric machines 160, 180 capable of achieving the torque requested in step 202. In other words, the controller 164 can calculate a plurality of possible combinations of the motor torques for the first and second electric machines 160, 180 that can achieve the torque requested in step 202. In the present disclosure, the term "a plurality of possible motor torques" refer to a plurality of possible combinations of the motor torque of the first electric machine 160 (i.e., the first motor torque) and the motor torque of the second electric machine 180 (i.e., the second motor torque) that can achieve the torque requested in step 202. When determining a plurality of possible motor torques in step 216, the controller 164 also determines the motor torques for the first and second electric machines 160, 180 even if one of the electric machines is free running (i.e., to receive or provide zero torque). Then, the method 200 proceeds to step 218.

Step 218 entails determining, via the controller 164, the system power losses of the hybrid powertrain 127 for all the possible combinations of the motor torques for the first and second electric machines 160, 180 determined in step 216 at the current vehicle speed in order to achieve the torque requested in step 202. In the present disclosure, "system power losses" of the hybrid powertrain 127 may be referred to as total power losses and include, but are not limited to, motor losses, inverter losses, load dependent mechanical losses, and battery losses. The "motor losses" refer to the power losses in the first and second electric machines 160, 180. The "inverter losses" refer to the power losses in the power inverters 165A, 165B. The "battery losses" refer to the power losses in the battery 170. The "load dependent mechanical losses" refer to the power losses in the mechanical components, such as the gearing arrangement 150 and the drive axle 112, that should transmit torque in order to achieve the torque requested in step 202. To calculate the system power losses, the controller 164 can add the motor losses, inverter losses, load dependent mechanical losses, and battery losses. Thus, the sum of the motor losses, inverter losses, load dependent mechanical losses, and battery losses equals the system power losses. In step 218, the unloaded mechanical losses are not necessarily considered when the hybrid powertrain 127 is operating either in the electric-only operating mode or the engine-off, regenerative mode because unloaded mechanical losses are only dependent on speed and all mechanical components move at the fixed speed at any given vehicle speed. In the present disclosure, the term "unloaded mechanical losses" refer to the power losses in the mechanical components, such as some gears in the gearing arrangement 150, that are only dependent on speed and not related to torque in step 202. Alternatively, in step 218, the unloaded mechanical losses may be considered. Regardless, step 218 may be performed online or offline. That is, the controller 164 can determine the system power losses in real time (i.e., online) or, alternatively, the controller 164 can use stored look-up tables or system models to determine the system power losses (offline). Irrespective of whether the controller 164 determines the system power losses online or offline, this determination is based, at least in part, on the vehicle speed and power. In summary, step 218 entails determining, via the controller 164, the system power losses of the hybrid powertrain 127 for all the possible motor torques for the first and second electric machines 160, 180 determined in step 216 capable of achieving the torque requested in step 202 at the current vehicle speed. After determining the system power losses for a plurality of possible motor torques for the first and second electric machines 160 and 180, the method 200 proceeds to step 220.

Step 220 entails determining, via the controller 164, the lowest power loss of all the system power losses determined in step 218 for a plurality of possible motor torques for the first and second electric machines 160, 180 determined in step 216. In other words, the controller 164 determines the lowest power loss for all the possible motor torques for the first and second electric machines 160, 180 that are capable of jointly achieving the torque requested in step 202. The lowest power loss corresponds with a specific motor torque combination for the first and second electric machines 160, 180. Thus, step 220 also entails determining, via the controller 164, a first operating torque for the first electric machine and a second operating torque for the second electric machine 180 that correspond with the minimum system power loss (i.e., the lowest power loss of the all the system power losses determined in step 218). As discussed above, the term "first operating torque" refers to the torque produced by the first electric machine 160, and the "second operating torque" refers to the torque produced by the second electric machine 180. In step 220, the controller 164 identifies the operating output torques for the first and second electric machines 160, 180 that are capable of generating the torque requested in step 202 while minimizing the system power losses. It is useful to minimize the system power losses in order to maximize the powertrain efficiency. It is envisioned that the operating output torques for the first and second electric machines 160, 180 corresponding to the minimum system power losses may include a situation when one of the first and second electric machines 160, 180 is free running (i.e., to receive or provide zero torque). Next, the method 200 continues to step 222.

Step 222 entails commanding, via the controller 164, the first electric machine 160 to generate the first operating torque determined in step 220 and the second electric machine 180 to generate the second operating torque determined in step 220 in order to achieve the torque requested in step 202 while minimizing the system power losses. In addition, step 222 includes generating the first and second operating torques that produce the torque requested in step 202 while minimizing the system power losses using the first and/or second electric machines 160, 180.

While the best modes for carrying out the teachings have been described in detail, those familiar with the art to which this disclosure relates will recognize various alternative designs and embodiments for practicing the teachings within the scope of the appended claims.

The invention claimed is:

1. A method for controlling a hybrid powertrain, the powertrain including a drive axle, an engine operatively coupled to the drive axle, a first electric machine operatively coupled to the drive axle, a second electric machine operatively coupled to the drive axle, and a controller in communication with the engine, the first electric machine, and the second electric machine, the method comprising:
receiving, via the controller, a torque request;
determining, via the controller, whether the hybrid powertrain is operating in the electric-only operating mode, wherein the engine is off when the hybrid powertrain is operating in the electric-only mode;
determining, via the controller, a plurality of possible motor torques of the first and second electric machines capable of achieving the torque requested only if the hybrid powertrain is operating in the electric-only mode;
determining system power losses of the powertrain for all the possible motor torques of the first and second electric machines capable of achieving the torque requested while the hybrid powertrain is operating in the electric-only mode;
determining a lowest power loss of the system power losses determined for the plurality of possible motor torques of the first and second electric machines while the hybrid powertrain is operating in the electric-only mode;
determining a first operating torque for the first electric machine and a second operating torque for the second electric machine that correspond to the lowest power loss while the hybrid powertrain is operating in the electric-only mode; and
commanding, via the controller, the first electric machine to generate the first operating torque and the second electric machine to generate the second operating torque in order to achieve the torque requested while minimizing the system power losses while the hybrid powertrain is operating in the electric-only mode.

2. The method of claim 1, further comprising determining a maximum output torque and a minimum output torque capable of being jointly generated by the first and second electric machines.

3. The method of claim 2, wherein the maximum output torque and the minimum output torque are based, at least in part, on a maximum battery power and a minimum battery power.

4. The method of claim 3, wherein the maximum output torque and the minimum output torque are based, at least in part, on a maximum motor torque of the first electric machine, a maximum motor torque of the second electric machine, and a minimum motor torque of the first electric machine, and a minimum motor torque of the second electric machine.

5. The method of claim 4, wherein the maximum output torque and the minimum output torque are based, at least in part, on an input brake torque capacity, wherein the input brake capacity is a capacity of an input brake connected to an engine crankshaft of the engine, the input brake is movable relative to a stationary member of the hybrid powertrain between an engaged position and a disengaged position, the input brake interconnects the engine crankshaft to the stationary member in the engaged position so as to prevent rotation of the engine crankshaft, and the input brake is decoupled from the stationary member in the disengaged position so as to allow the engine crankshaft to rotate.

6. The method of claim 5, further comprising determining, via the controller, whether the input brake is in the engaged position, wherein the maximum output torque and the minimum output torque are determined only if the input brake is in the engaged position.

7. The method of claim 6, further comprising determining whether the torque requested is less than or equal to the maximum output torque and greater than or equal to the minimum output torque, wherein the first operating torque for the first electric machine and the second operating torque for the second electric machine are based, at least in part, on the maximum output torque and the minimum output torque if the torque requested is greater than or equal to the maximum output torque and the input brake is in the engaged position.

8. The method of claim 7, wherein the first operating torque for the first electric machine and the second operating torque for the second electric machine are based, at least in part, on the maximum output torque and the minimum output torque if the torque requested is less than or equal to the minimum output torque and the input brake is in the engaged position.

9. The method of claim 7, wherein determining, via the controller, the plurality of possible motor torques for the first and second electric machines capable of achieving the torque requested is performed if the torque requested is less than or equal to the maximum output torque and greater than or equal to the minimum output torque and the input brake is in the engaged position.

10. The method of claim 9, wherein determining the system power losses includes determining motor losses, inverter losses, load dependent mechanical losses, and battery losses for all the possible motor torques for the first and second electric machines capable of achieving the torque requested, and the system power losses are not based on unloaded mechanical losses.

11. A hybrid powertrain, comprising:
a drive axle;
an engine operatively coupled to the drive axle;
a first electric machine operatively coupled to the drive axle;
a second electric machine operatively coupled to the drive axle; and
a controller in communication with the engine, the first electric machine, and the second electric machine, wherein the controller is programmed to:
receive a torque request;
determine a plurality of possible motor torques for the first and second electric machines capable of achieving the torque requested;
determine system power losses of the powertrain for all the possible motor torques of the first and second electric machines capable of achieving the torque requested while the engine is off;
determine a lowest power loss of the system power losses determined for the plurality of possible motor torques of the first and second electric machines while the engine is off;
determine a first operating torque for the first electric machine and a second operating torque for the second electric machine that correspond with the lowest power loss while the engine is off; and
command the first electric machine to generate the first operating torque and the second electric machine to generate the second operating torque in order to achieve the torque requested while minimizing the system power losses while the engine is off.

12. The hybrid powertrain of claim 11, wherein the controller is programmed to determine a maximum output torque and a minimum output torque capable of being jointly generated by the first and second electric machines only if the hybrid powertrain is operating in a mode selected from a group consisting of an electric-only operating mode and an engine-off, regenerative mode.

13. The hybrid powertrain of claim 12, further comprising an input brake connected to an engine crankshaft of the engine, wherein the input brake is movable relative to a stationary member of the hybrid powertrain between an engaged position and a disengaged position, the input brake interconnects the engine crankshaft to the stationary member in the engaged position so as to prevent rotation of the engine crankshaft, and the input brake is decoupled from the stationary member in the disengaged position so as to allow the engine crankshaft to rotate, the engine is off and the input brake is in the engaged position when the hybrid powertrain is operating in the electric-only operating mode, and the first and second electric machines operate as generators when the hybrid powertrain is operating in the engine-off, regenerative mode.

14. The hybrid powertrain of claim 13, wherein the maximum output torque and the minimum output torque are based, at least in part, on a maximum motor torque of the first electric machine, a maximum motor torque of the second electric machine, and a minimum motor torque of the first electric machine, and a minimum motor torque of the second electric machine, and an input brake torque capacity of the input brake.

15. The hybrid powertrain of claim 14, wherein the controller is programmed to determine the system power losses in real time.

16. The hybrid powertrain of claim 15, wherein the controller is programmed to determine whether the torque requested is less than or equal to the maximum output torque and greater than or equal to the minimum output torque, and the first operating torque for the first electric machine and the second operating torque for the second electric machine are based, at least in part, on the maximum output torque and the minimum output torque if the torque requested is greater than or equal to the maximum output torque.

17. The hybrid powertrain of claim 16, wherein the system power losses are based, at least in part, on vehicle speed.

18. The hybrid powertrain of claim 17, wherein the first operating torque for the first electric machine and the second operating torque for the second electric machine are based, at least in part, on the maximum output torque and the minimum output torque if the torque requested is less than or equal to the minimum output torque.

19. The hybrid powertrain of claim 16, wherein the controller is programmed to determine the plurality of possible motor torques for the first and second electric machines capable of achieving the torque requested at a current vehicle speed is performed if the torque requested is less than or equal to the maximum output torque and greater than or equal to the minimum output torque.

20. The hybrid powertrain of claim 19, wherein the controller is programmed to determine motor losses, inverter losses, load dependent mechanical losses, and battery losses for all the possible motor torques of the first and second electric machines capable of achieving the torque requested in order to determine the system power losses, and the controller does not consider unloaded mechanical losses when determining system power losses.

* * * * *